(12) United States Patent
Ritter et al.

(10) Patent No.: US 6,598,720 B2
(45) Date of Patent: Jul. 29, 2003

(54) FAN CLUTCH

(75) Inventors: Joachim Ritter, Herzogenaurach (DE); Johann Stark, Höchstadt (DE)

(73) Assignee: Ina Walzlager Schaeffler oHG (DE)

(*) Notice: Subject to any disclaimer, the term of this patent is extended or adjusted under 35 U.S.C. 154(b) by 0 days.

(21) Appl. No.: 10/000,594

(22) Filed: Oct. 19, 2001

(65) Prior Publication Data
US 2002/0053496 A1 May 9, 2002

(30) Foreign Application Priority Data
Oct. 20, 2000 (DE) .......................... 100 51 985

(51) Int. Cl.[7] ................. F01P 5/04; F16D 27/12
(52) U.S. Cl. ............... 192/48.2; 192/84.31; 192/110 B; 384/463; 384/492
(58) Field of Search .................. 192/48.2, 84.31, 192/84.96, 110 B; 384/492, 913, 463

(56) References Cited

U.S. PATENT DOCUMENTS

| | | | | |
|---|---|---|---|---|
| 3,929,651 A | * | 12/1975 | Murray et al. ............... | 508/512 |
| 4,926,992 A | * | 5/1990 | Linnig ........................ | 192/48.2 |
| 5,165,804 A | * | 11/1992 | Fisher et al. ................. | 384/492 |
| 5,284,394 A | * | 2/1994 | Lemelson .................... | 384/463 |
| 5,593,234 A | | 1/1997 | Liston | |
| 5,731,274 A | * | 3/1998 | Andrew ....................... | 508/272 |
| 5,741,762 A | * | 4/1998 | Kahlman .................... | 508/108 |

FOREIGN PATENT DOCUMENTS

| WO | 9844270 | 10/1998 |
|---|---|---|
| WO | 0057071 | 9/2000 |

OTHER PUBLICATIONS

Copy of Patent Abstracts of Japan, No. 07127644 A (1 pg) May 16, 1995.

* cited by examiner

Primary Examiner—Richard M. Lorence
(74) Attorney, Agent, or Firm—Muserlian, Lucas and Mercanti

(57) ABSTRACT

A fan rotor (7) for an electromagnetic fan clutch is mounted on a drive shaft (1) with the help of a three-ring bearing (8) so that three different speeds of rotation of the fan rotor (7) can be obtained. To reduce wear, especially in the presence of impact loads and oscillatory movements of the three-ring bearing (8), this three-ring bearing (8) is configured so that different materials are paired with each other in regions of rolling contact.

7 Claims, 3 Drawing Sheets

FAN CLUTCH

FIELD OF THE INVENTION

The invention concerns an electromagnetic fan clutch for an internal combustion engine, said fan clutch comprising a drive shaft retained in a housing by spaced-apart first rolling bearings, said drive shaft being connected at one end to a fan rotor by a second rolling bearing that is configured as a three-ring bearing having a first ring, an intermediate ring and a third ring and rows of rolling elements arranged between said rings, the inner ring being firmly connected to the drive shaft, the outer ring being firmly connected to the fan rotor, the intermediate ring being adapted to be coupled to the drive shaft by a first electromagnetic clutch and the outer ring being adapted to be coupled to the drive shaft by a second electromagnetic clutch.

BACKGROUND OF THE INVENTION

In automotive vehicles, cooling media are cooled by fans and the temperature of the cooling medium is used directly for controlling the electromagnetic fan clutch. With this electronically controlled clutch, it is guaranteed that the operating temperature of the engine is held at a constant high level, the engine performance is optimally utilized and the pollutant content in the exhaust gases is reduced.

An electromagnetic fan clutch of the pre-cited type is known, for example, from a prospectus of LINNIG ANTRIEBSTECHNIK GMBH 9/89. This prior art shows a drive shaft that is mounted in a housing through two spaced apart rolling bearings. This shaft is connected at one end to a belt pulley that is operatively connected to a crankshaft through a belt. At the other end, a fan rotor is connected to the drive shaft through a three-ring bearing. This electromagnetic fan clutch further comprises two electromagnetic clutches that can couple the outer ring and the intermediate ring of the three-ring bearing to the drive shaft. This assures that the fan can rotate at three different speeds of rotation.

A drawback of the prior art is that in certain states of operation, the rolling bearings of the three-ring bearing are practically at a standstill while the associated bearing rings rotate at a high speed. This results in a high degree of wear in the bearing of the fan rotor and leads to its premature failure. This high degree of wear of the bearing is further intensified by vibratory loads caused by the torsional vibrations of the crankshaft especially if the fan clutch is mounted directly on the crankshaft.

OBJECTS OF THE INVENTION

It is therefore an object of the invention to improve a rolling bearing for a fan rotor of the pre-cited type so that the rolling bearing withstands all conditions of operation of the electromagnetic fan clutch without any problem and therefore has a long operating life.

This and other objects and advantages of the invention will become obvious from the following detailed description.

SUMMARY OF THE INVENTION

The invention achieves the above objects by the fact that at least in the second rolling bearing, different materials are paired with each other in regions of rolling contact. For the purposes of the invention, this means that the rolling elements and the associated bearing rings are made of different materials either over their entire cross-section or at least in a surface region. This results in change of the coefficient of friction at the points of contact between the rolling elements and the bearing rings which prevents damage to the bearing, particularly the damage that the rolling elements cause to their own raceways when they get pressed into them.

According to further features of the invention, the components participating in the rolling contact are provided with a wear-resistant hard coating. It is also sufficient if at least one of a row of rolling elements between the inner ring and the intermediate ring and a row of rolling elements between the intermediate ring and the outer ring comprises this wear-resistant hard coating. In one embodiment of the invention, this hard coating is provided on the raceway of the inner ring and the inner raceway of the intermediate ring, while in another embodiment, this wear-resistant hard coating is provided on the raceway of the outer ring and the outer raceway of the intermediate ring.

According to still another feature of the invention the material of the coating can be chromium (Cr), chromium nitride (CrN), titanium nitride (TiN), titanium carbonitride (TiCN) or tungsten carbide/carbon (WC/C). When paired with steel, these coatings manifest a high resistance to abrasion.

According to an additional feature of the invention, the chromium coating has a layer thickness of 0.01 to 8.0 µm.

According to still another feature of the invention, the coating can be deposited by electrolytic or by PVD or CVD methods. Depending on the part to be coated, electrolytic deposition is performed using a stand or as a coating of mass-produced parts in drums or bells. The CVD method (Chemical Vapor Deposition) is based on the precipitation of solid matter out of the gaseous phase by chemical reactions. CVD technology utilizes the fact that volatile compounds react chemically upon input of heat and produce a corresponding precipitation. The term PVD covers coating methods through which metals and their alloys as well as chemical compounds such as oxides, nitrides, carbides are precipitated by an input of thermal or kinetic energy by particle bombardment under vacuum. PVD methods that are generally conducted under vacuum at temperatures between 500 and 550° C., include vapor deposition under high vacuum, ion plating and cathodic sputtering.

Alternatively, the invention also achieves its objects by the fact that at least the second rolling bearing is filled with a solid lubricant which, if need be, is filled in a carrier substance which, according to a provision of the invention can be a lithium soap grease on a mineral oil base. In contrast to the first solution provided by the invention, the change in the coefficient of friction is not brought about by pairing different materials in rolling contact with each other but is exclusively guaranteed by the solid lubricant particles arranged between the friction surfaces.

A third solution offered by the invention for achieving its objects is a combination of the first two solutions.

According to a final feature of the invention, the second rolling bearing is a three-ring bearing with an inner and an outer two-row angular contact ball bearing in back-to-back arrangement, the pressure angle of the inner bearing being larger than the pressure angle of the outer bearing.

The invention will now be described with reference to the following examples of embodiment and the appended drawings.

DETAILED DESCRIPTION OF THE DRAWING

Figure 1:
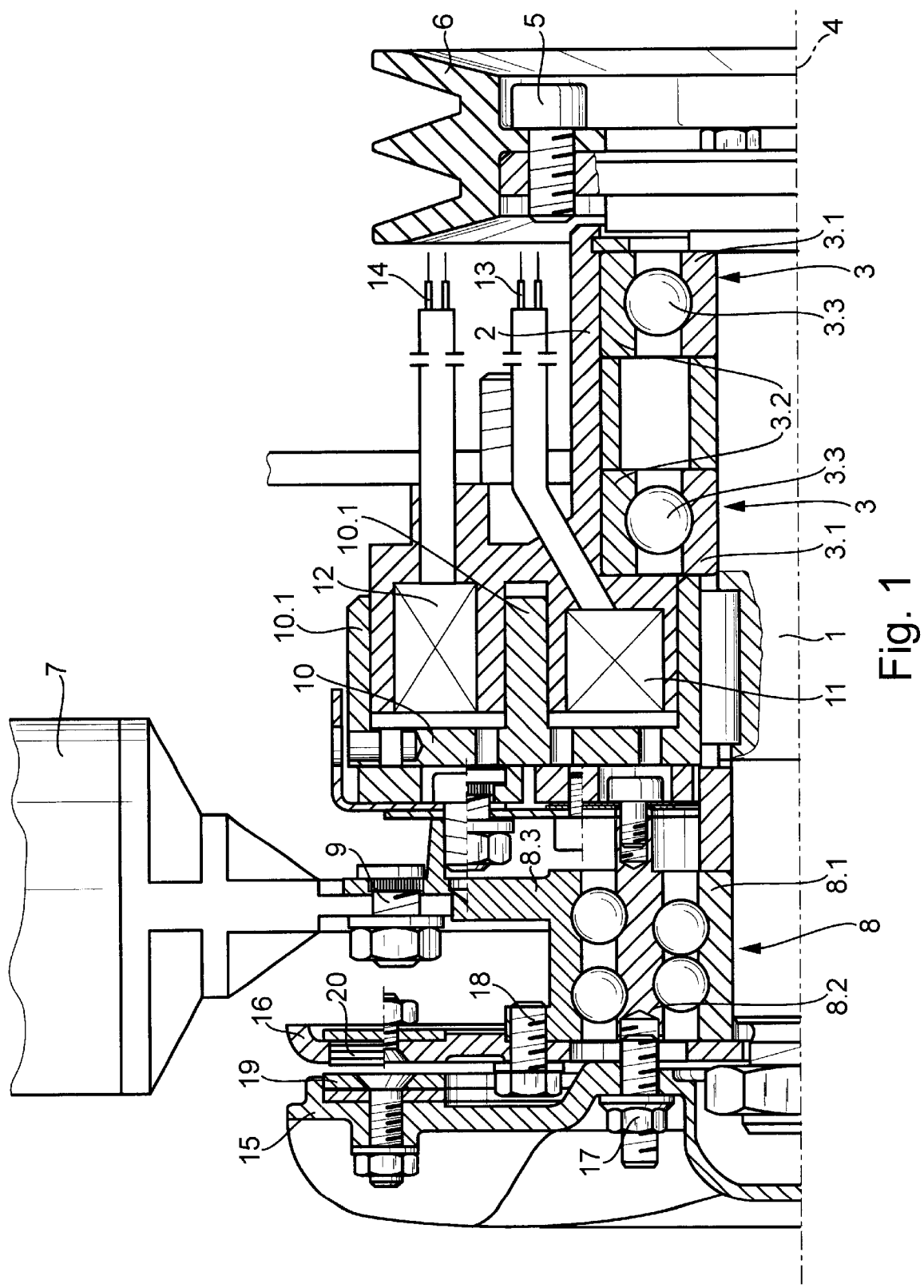
FIG. 1 is a longitudinal section through an electromagnetic fan clutch of a prior art device.
Figure 3:
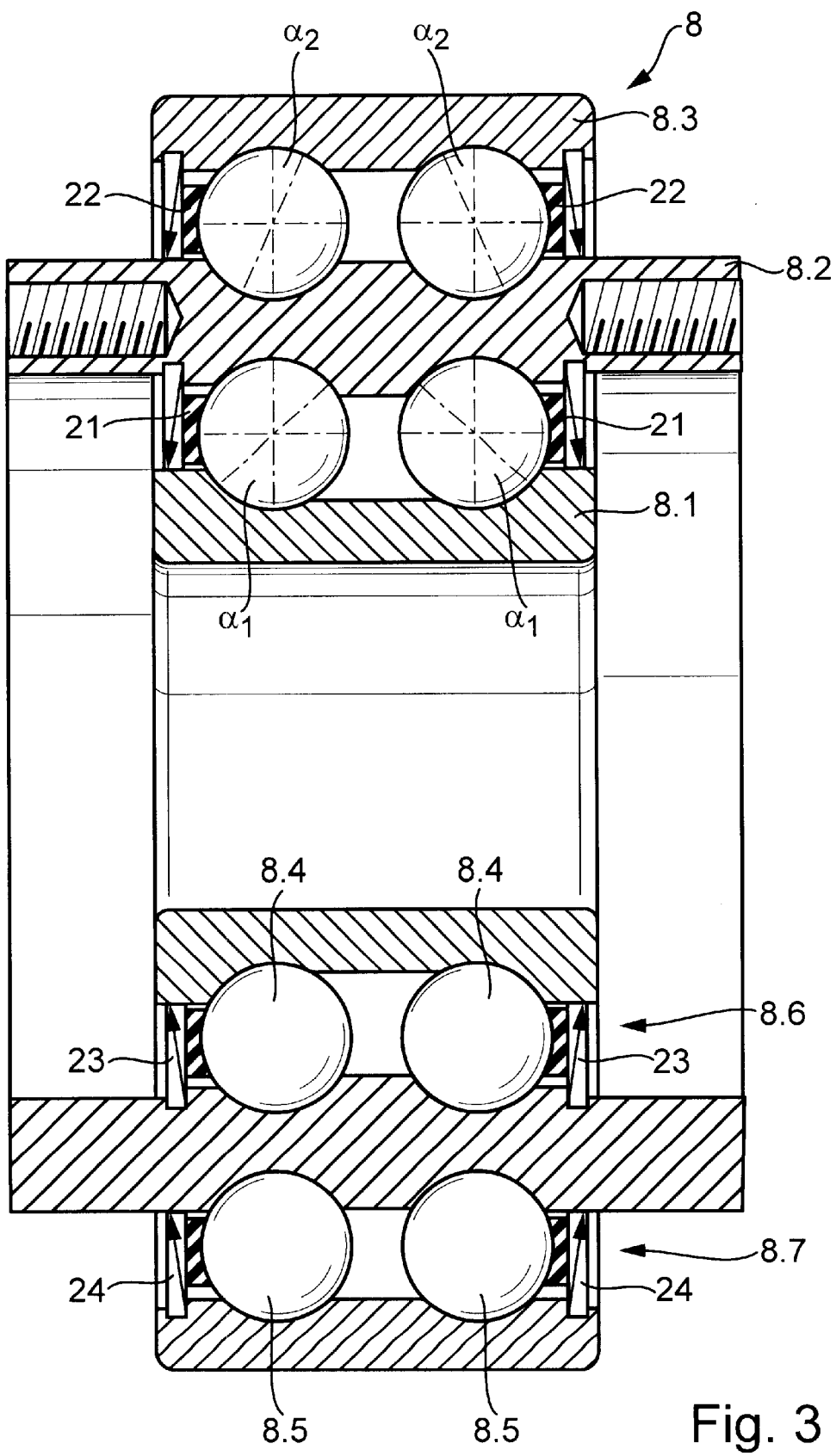
FIG. 3 shows a three-ring angular contact ball bearing of the invention for a fan mounting.

A drive shaft identified at 1 in FIG. 1 is mounted for rotation about its axis 4 on two first spaced-apart rolling bearings 3 in a housing 2. The first rolling bearings 3 in this example are configured as ball bearings having an inner ring 3.1, an outer ring 3.2 and a row of balls 3.3. At its right end in the figure, the drive shaft 1 is connected by fixing screws 5 to the belt pulley 6 by which it is driven. At the left end, the fan rotor 7 is connected to the drive shaft 1 by the second rolling bearing 8. As can be seen in FIG. 3, the second rolling bearing 8 comprises the inner ring 8.1, the intermediate ring 8.2 and the outer ring 8.3. The second rolling bearing 8 further comprises the rows of balls 8.4 and 8.5 arranged between the bearing rings 8.1, 8.2 and 8.3 next to and above each other for rolling contact. The fan rotor 7 is firmly connected to the outer ring 8.3 by fixing screws 9.

The fan clutch also includes the radially outward extending part 10 that is firmly connected to the drive shaft 1 and from which branches 10.1 extend in axial direction. In the intermediate space thus formed is disposed the first magnetic clutch 11, and radially outwards above this, the second magnetic clutch 12. These clutches 11 and 12 can be energized through the current supply leads 13, 14. The fan clutch further comprises the parts 15 and 16 that are connected by fixing screws 17 and 18 to the intermediate ring 8.2 and the outer ring 8.3 respectively. The part 15 connected to the intermediate ring 8.2 and the part 16 connected to the outer ring 8.3 both comprise on their opposing end faces, a permanent magnet 19 and 20 respectively.

Figure 2:
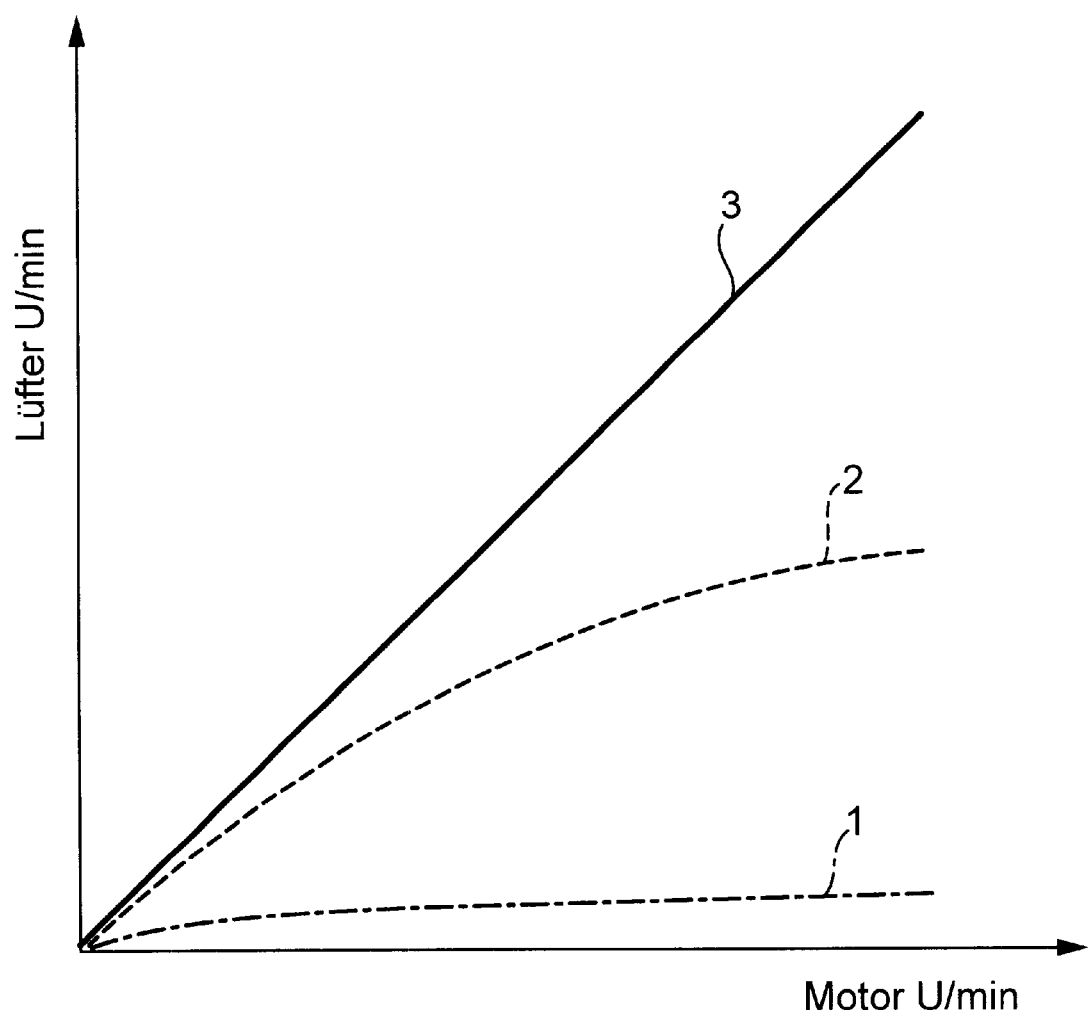
FIG. 2 is a graphic representation showing the dependence of the rotational speed of the fan on the rotational speed of the drive shaft in different states of operation.

There now follows a brief description of the three possible states of operation of the fan clutch represented in FIG. 2. When both the first and the second electromagnetic clutches 11, 12 are switched off, the speed curve identified at 1 in FIG. 2 is obtained. In this state, the fan rotor 7 rotates independently of the drive shaft 1 at a speed of up to 100 rpm solely due to the friction of the second rolling bearing 8. If the first electromagnetic clutch 11 is actuated by a temperature pick-off, a contactless and wear-free operating permanent system arranged downstream of the electromagnetic clutch causes a rotation of the fan rotor 7 at a speed of about 1200 rpm, see speed curve 2. The force transmission in this case is effected from the drive shaft 1 through the first electromagnetic clutch 11 to the intermediate ring 8.2, from there through the part 15 connected to the intermediate ring and through the permanent magnet 19 to the permanent magnet 20 and from there to the part 16 that, in its turn, is firmly connected to the outer ring 8.3. If, on the other hand, the second electromagnetic clutch 12 is actuated by a second temperature pick-off, the fan rotor 7 runs synchronously to the drive shaft 1, see speed curve 3 in FIG. 2. Through the second electromagnetic clutch 12, the outer ring 8.3 of the second rolling bearing 8 is coupled to the radial part 10 of the drive shaft 1 and therefore rotates at the same speed.

The enlarged representation of FIG. 3 shows a modified second rolling bearing 8 configured as a three-ring bearing in the form of a two-row inner angular contact ball bearing 8.6 and a two-row outer angular contact ball bearing 8.7 in back-to-back arrangement. As can be seen in FIG. 3, the pressure angle $\alpha_1$ of the inner angular contact ball bearing 8.6 is larger than the pressure angle $\alpha_2$ of the associated outer angular contact ball bearing 8.7 so that the rigidity of the second rolling bearing 8 is enhanced. This is advantageous because the load is introduced through the inner ring 8.1. Each of the bearing rings 8.1, 8.2 and 8.3 is made in one piece. The rows of balls 8.4 and 8.5 are guided in separate cages 21 and 22 and sealed from the outside by oppositely arranged seals 23, 24. The bearing rings 8.1, 8.2 and 8.3 are made of 100Cr6 and have a value of 58+6 HRC after hardening and tempering. The cages 21, 22 are made of a polyamide material.

A drum in which a number of bearing balls made of a rolling bearing steel were filled was suspended in a chromium electrolyte having 500 g/l chromium trioxide, 8 g/l methane sulphonic acid, 10 g/l magnesium silicofluoride and 0.1 ml/l teraethylammonium perfluoroctane sulphonate. These bearing balls were coated with a layer thickness of 0.7 $\mu$m at a current density of approximately 1.5 A/cm$^2$. The working temperature of the chromium electrolyte was about 40° C. The bearing balls comprising such a chromium coating were filled into a rolling bearing 8 according to FIG. 3 to form the bearing ball rows 8.4 and then installed in an electromagnetic fan clutch according to FIG. 1. It was determined that in contrast to conventional bearing balls, a considerably longer operating life of the fan arrangement was achieved even under impact loading and oscillatory movements or vibrations with the ball rows 8.4, 8.5 at a standstill and the bearing rings 8.1, 8.2, 8.3 rotating.

Similarly good results were obtained with a bearing 8 installed in a fan arrangement in which the bearing components 8.1, 8.2, 8.3, 8.4 and 8.5 were made of a rolling bearing steel and which was filled with a high-duty grease having solid lubricants. The product used was Gleitmo 585 M made by FUCHS LUBRITECH GMBH. Compared to s bearing arrangement of the prior art, a rolling bearing 8 lubricated in this manner and used in a fan arrangement remains free of wear to the largest possible extent even in the presence of the prevailing impact loads, vibrations and oscillatory movements.

What is claimed is:

1. An electromagnetic fan clutch for an internal combustion engine, said fan clutch comprising a drive shaft retained in a housing by spaced first rolling bearings, said drive shaft being connected at one end to a fan rotor by a second rolling bearing that is configured as a three-ring bearing having an inner ring, an intermediate ring an outer ring and rows of rolling elements arranged between said rings, the inner ring being firmly connected to the drive shaft, the outer ring being firmly connected to the fan rotor, the intermediate ring being adapted to be coupled to the drive shaft by a first electromagnetic clutch and the outer ring being adapted to be coupled to the drive shaft by a second electromagnetic clutch, and at least in the second rolling bearing, different materials being paired with each other in regions of rolling contact, wherein at least one of a row of rolling elements between the intermediate ring and the outer ring comprises a wear-resistant hard coating.

2. An electromagnetic fan clutch of claim 1, wherein the hard coating comprises one of chromium (Cr), chromium nitride (CrN), titanium nitride (TiN), titanium carbonitride (TiCN) and tungsten carbide/carbon (WC/C).

3. An electromagnetic fan clutch of claim 2, wherein the hard coating comprising chromium has a thickness of 0.01 to 8.0 $\mu$m.

4. An electromagnetic fan clutch of claim 1, wherein the hard coating is deposited by one of an electrolytic method, a PVD (physical vapor deposition) method and a CVD (chemical vapor deposition) method.

5. An electromagnetic fan clutch of claim 1, wherein the second rolling bearing is three-ring bearing comprising an inner and an outer two-row angular contact ball bearing in back-to back arrangement, and a pressure angle $\alpha_1$ of the inner bearing is larger than the pressure angle $\alpha_2$ of the outer bearing.

6. An electromagnetic fan clutch for an internal combustion engine, said fan clutch comprising a drive shaft retained in a housing by spaced first rolling bearings, said drive shaft being connected at one end to a fan rotor by a second rolling bearing that is configured as a three-ring bearing having an inner, an intermediate ring and an outer ring and rows of rolling elements arranged between said rings, the inner ring being firmly connected to the fan rotor, the intermediate ring bearing adapted to be coupled to the drive shaft by a first electromagnetic clutch and the outer ring being adapted to be coupled to the drive shaft by a second electromagnetic clutch, and at least in the second rolling bearing, different materials being paired with each other in regions of rolling contact, wherein a raceway of the inner ring and an inner raceway of the intermediate ring comprise a wear-resistant hard coating.

7. An electromagnetic fan clutch for an internal combustion engine, said fan clutch comprising a drive shaft retained in a housing by spaced-apart first rolling bearings, said drive shaft being connected at one end to a fan rotor by a second rolling bearing that is configured as a three-ring bearing having an inner ring, an intermediate ring and an outer ring and rows of rolling elements arranged between said rings, the inner ring being firmly connected to the fan rotor, the intermediate ring being adapted to be coupled to the drive shaft by a electromagnetic clutch and the outer ring being adapted to be coupled to the drive shaft by a second electromagnetic clutch, at least the second rolling bearing being filled with a solid lubricant which may be filled in a carrier substance wherein the carrier substance is a lithium soap grease on a mineral oil base.

* * * * *